(12) United States Patent
Mouri et al.

(10) Patent No.: US 7,003,952 B2
(45) Date of Patent: Feb. 28, 2006

(54) MASTER CYLINDER AND METHOD OF PRODUCING THE SAME

(75) Inventors: Tomonori Mouri, Yamanashi (JP);
Takato Ogiwara, Yamanashi (JP);
Yasuhiko Amari, Yamanashi (JP);
Naganori Koshimizu, Yamanashi (JP)

(73) Assignee: Kabushiki Kaisha Hitachi Seiksakusho, Tokyo (JP)

( * ) Notice: Subject to any disclaimer, the term of this patent is extended or adjusted under 35 U.S.C. 154(b) by 29 days.

(21) Appl. No.: 10/372,951

(22) Filed: Feb. 26, 2003

(65) Prior Publication Data

US 2003/0233828 A1    Dec. 25, 2003

(30) Foreign Application Priority Data

Feb. 28, 2002  (JP) ............................. 2002-054453

(51) Int. Cl.
*B60T 11/20* (2006.01)
(52) U.S. Cl. ...................... 60/562; 60/585; 29/888.044
(58) Field of Classification Search ................. 60/562, 60/585; 29/888, 888.044; 164/97, 137
See application file for complete search history.

(56) References Cited

U.S. PATENT DOCUMENTS

| | | | | |
|---|---|---|---|---|
| 4,458,743 A | * | 7/1984 | Logvinov et al. | 164/342 |
| 4,757,857 A | * | 7/1988 | Henkel | 164/137 |
| 4,899,799 A | * | 2/1990 | Drazy | 164/34 |
| 4,919,189 A | * | 4/1990 | Sato et al. | 164/137 |
| 5,131,144 A | | 7/1992 | Saalbach et al. | |
| 5,603,217 A | * | 2/1997 | Majersik et al. | 60/562 |
| 5,715,681 A | * | 2/1998 | Williamson | 60/585 |
| 6,578,360 B1 | * | 6/2003 | Mouri et al. | 60/562 |

* cited by examiner

*Primary Examiner*—Hoang Nguyen
(74) *Attorney, Agent, or Firm*—Wenderoth, Lind & Ponack, L.L.P.

(57) ABSTRACT

A master cylinder has a cylinder member in the shape of a cylinder, one end of which is closed, and a piston inserted in the cylinder member to form a pressure chamber in the cylinder member. The cylinder member is formed with a port for providing communication between the pressure chamber and a reservoir. The port is formed during casting of the cylinder member, thereby eliminating the need to form the port by boring, and forming the port into an elongated-hole shaped sectional configuration.

10 Claims, 7 Drawing Sheets

MASTER CYLINDER AND METHOD OF PRODUCING THE SAME

BACKGROUND OF THE INVENTION

The present invention relates to a master cylinder for supplying a brake fluid to a brake system of an automobile or the like.

A master cylinder has a cylinder member in the shape of a cylinder, one end of which is closed, and a piston inserted in the cylinder member to form a pressure chamber in the cylinder member. The piston reduces the volume of the pressure chamber according to the amount of depression of the associated brake pedal, thereby supplying the brake fluid from the pressure chamber to the brake system.

In such a master cylinder, for example, a port is formed in the cylinder member to provide communication between the pressure chamber and a reservoir for storing the brake fluid to supply the brake fluid into the pressure chamber. It is necessary in order to supply the brake fluid smoothly to ensure a sufficient fluid passage sectional area for the port. Conventionally, the port is formed by boring and has a circular sectional configuration. Therefore, in order to ensure a sufficient fluid passage sectional area for such a port having a circular sectional configuration, the diameter of the port needs to be enlarged. However, there are limits to ensuring a sufficient fluid passage sectional area simply by increasing the port diameter because of the relationship with other constituent parts. It has been contrived to ensure a sufficient fluid passage sectional area by providing a plurality of circumferentially spaced holes in the cylinder member. However, this method needs to perform a boring process a plurality of times and hence requires an increased number of man-hours for processing, resulting in an increase in cost.

An object of the present invention is to provide a master cylinder capable of being produced with a reduced number of man-hours and hence at reduced cost and still capable of ensuring a sufficient fluid passage sectional area for the port.

SUMMARY OF THE INVENTION

To attain the above-described object, the present invention provides a master cylinder having a cylinder member in the shape of a cylinder, one end of which is closed, and a piston inserted in the cylinder member to form a pressure chamber in the cylinder member. The cylinder member is formed with a port for providing communication between the pressure chamber and a reservoir. The port is formed during casting of the cylinder member.

Thus, because the port is formed during casting of the cylinder member, it is unnecessary to form the port by boring. In addition, the port can readily be formed into a sectional configuration other than a circular one because it is formed during casting.

In one example of the master cylinder according to the present invention, the port is in the shape of a hole elongated in the circumferential direction of the cylinder member.

If the port is in the shape of a hole elongated in the circumferential direction of the cylinder member as stated above, it is possible to ensure a sufficient fluid passage sectional area for the port.

In another example of the master cylinder according to the present invention, the port has a trapezoidal sectional configuration decreasing in width toward the bottom of the cylinder member.

If the port has a trapezoidal sectional configuration decreasing in width toward the bottom of the cylinder member as stated above, the port forms an obtuse angle to the advance of a cutting tool when machining the inner peripheral surface of the cylinder member. As a result, it is possible to reduce the creation of burrs projecting toward the port. Accordingly, the deburring operation becomes unnecessary. In this regard also, the number of man-hours for processing can be reduced. Hence, the costs can be reduced.

DETAILED DESCRIPTION OF THE INVENTION

A master cylinder according to one embodiment of the present invention will be described below with reference to the accompanying drawings.

Figure 1:
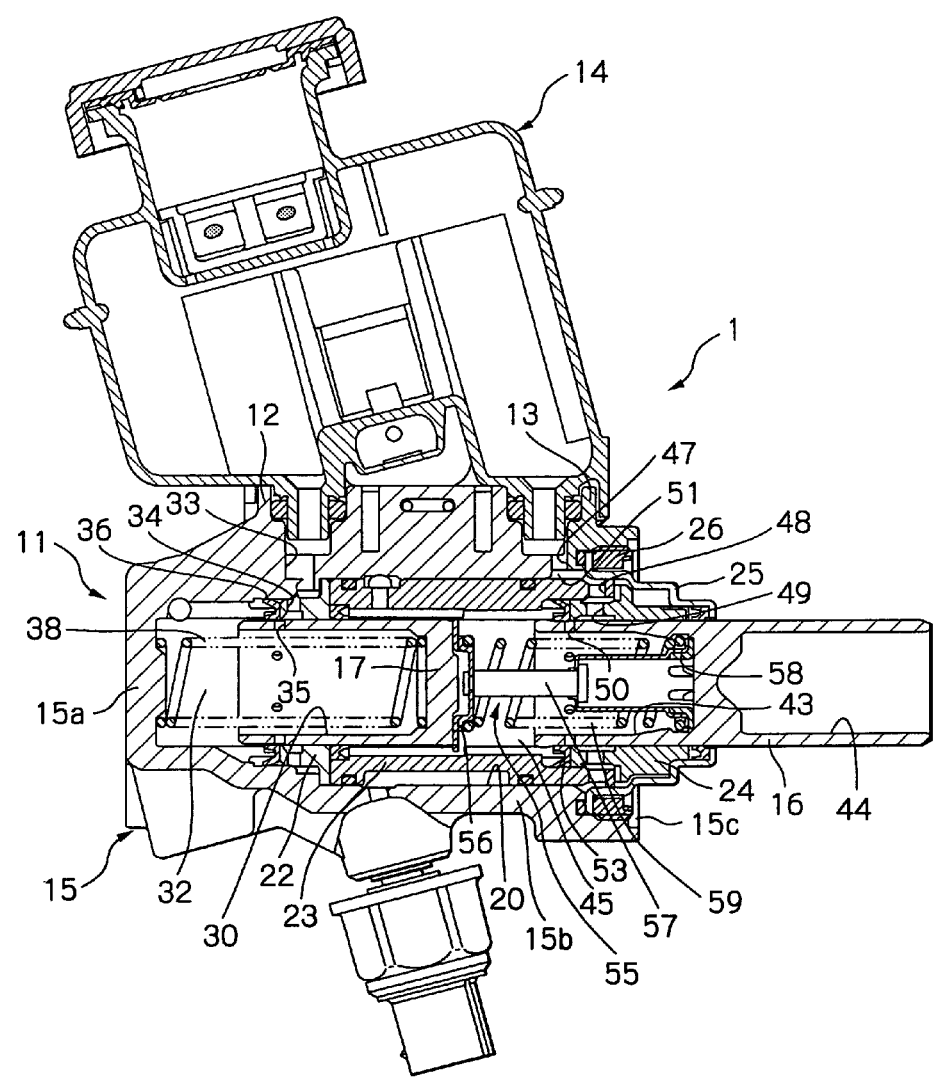
FIG. 1 is a sectional side view showing the arrangement of a master cylinder according to one embodiment of the present invention.

In FIG. 1, reference numeral 1 denotes a master cylinder according to this embodiment. The master cylinder 1 has a master cylinder body 11 for generating a brake fluid pressure by a force corresponding to an input applied to a brake pedal, which is introduced thereto through a vacuum booster (not shown). A reservoir 14 is secured to a pair of boss portions 12 and 13 provided on the master cylinder body 11. The reservoir 14 supplies the brake fluid to the master cylinder body 11 and also restores it therefrom The master cylinder body 11 has a horizontally extending cylinder member 15 in the shape of a cylinder, one end of which is closed. A primary piston 16 is slidably provided in the cylinder member 15 at the side thereof closer to an opening 15c (at the right-hand side in the figure). A secondary piston 17 is slidably provided in the cylinder member 15 at the side thereof closer to a bottom 15a than the primary piston 16 (at the left-hand side in the figure).

The cylinder member 15 is in the shape of a cylinder, one end of which is closed. The cylinder member 15 has a bottom 15a and a cylindrical portion 15b formed with a stepped bore 20 extending in the axial direction. It should be noted that a pair of boss portions 12 and 13 for mounting the reservoir 14 are formed on the cylindrical portion 15b at respective positions displaced in the axial direction of the cylindrical portion 15b in a state where the positions of the boss portions 12 and 13 in the circumferential direction of the cylindrical portion 15b are coincident with each other.

The master cylinder body 11 has an approximately cylindrical first member 22, second member 23 and third member 24 that are provided in the stepped bore 20 of the cylinder member 15 in order from the bottom 15a side. A fourth member 25 is provided at the side of the third member 24 remote from the bottom 15a so as to cover the third member 24. A fifth member 26 is provided at the side of the fourth member 25 remote from the bottom 15a and screwed to the opening 15c side of the cylinder member 15 to retain the first to fourth members 22 to 25 to the cylinder member 15.

The secondary piston 17 is slidably fitted inside the first member 22 and the second member 23. The secondary piston 17 is in the shape of a cylinder, one end of which is closed. The secondary piston 17 has a bore 30 extending in the axial direction thereof. The secondary piston 17 is slidably fitted to the cylinder member 15, the first member 22 and the second member 23 such that the bore 30 faces the bottom 15a of the cylinder member 15.

A secondary fluid pressure chamber 32 is defined by a space between the bottom 15a of the cylinder member 15 and the end of the secondary piston 17 closer to the bottom 15a, that is, closer to the bore 30.

A port 33 is formed in a bottom (15a) side portion of the cylindrical portion 15b of the cylinder member 15. The port 33 extends in a direction perpendicular to the axis of the cylindrical portion 15b. One end of the port 33 opens on the inner peripheral surface of the cylindrical portion 15b. The other end of the port 33 opens on the outer peripheral surface of the cylindrical portion 15b to communicate with the interior of the boss portion 12. The first member 22 has a port 34 extending in a direction perpendicular to the axis thereof. One end of the port 34 opens on the radially inner peripheral surface of the first member 22. The other end of the port 34 opens on the outer peripheral surface of the first member 22, that is, toward the cylinder member 15. The ports 33 and 34 are in communication with the reservoir 14 at all times. The secondary piston 17 has a port 35 extending in a direction perpendicular to the axis thereof. The port 35 allows communication between the port 34 and the secondary fluid pressure chamber 32.

A cup seal 36 is provided between the first member 22 and the cylinder member 15. The cup seal 36 is capable of cutting off the communication between the port 35, that is, the secondary fluid pressure chamber 32, and the port 34. The cup seal 36 cuts off the communication between the secondary fluid pressure chamber 32 and the reservoir 14 when the fluid pressure in the secondary fluid pressure chamber 32 is not lower than the fluid pressure in the reservoir 14. When the fluid pressure in the secondary fluid pressure chamber 32 is lower than the fluid pressure in the reservoir 14, the cup seal 36 allows communication between the secondary fluid pressure chamber 32 and the reservoir 14 to supply the brake fluid.

A secondary piston spring 38 is provided between the bore 30 of the secondary piston 17 and the bottom 15a of the cylinder member 15 to define the spacing therebetween in an initial state where there is no input from the brake pedal side (not shown, i.e. from the right-hand side in FIG. 1; the position of each member or portion in the initial state will hereinafter be referred to as "initial position"). When it is in the initial position, the secondary piston 17 allows the port 35 to communicate with the port 34 and, consequently, permits the secondary fluid pressure chamber 32 to communicate with the reservoir 14.

If the secondary piston 17 moves from this position toward the bottom 15a of the cylinder member 15, when the fluid pressure in the secondary fluid pressure chamber 32 is not lower than the fluid pressure in the reservoir 14, the cup seal 36 cuts off the communication between the port 35 of the secondary piston 17 and the port 34. As a result, the communication between the secondary fluid pressure chamber 32 and the reservoir 14 is cut off. Consequently, as the secondary piston 17 further moves toward the bottom 15a, the brake fluid is supplied from the secondary fluid pressure chamber 32 to the brake system (not shown).

The primary piston 16 is slidably fitted inside the second member 23 and the third member 24. The primary piston 16 has a bore 43 formed at one end thereof. The bore 43 is disposed to face the secondary piston 17. Another bore 44 is formed at the other end of the primary piston 16. A rod of a vacuum booster (not shown) is inserted into the bore 44.

A primary fluid pressure chamber 45 is defined by a space between the end of the secondary piston 17 remote from the bottom 15a and the end of the primary piston 16 closer to the bottom 15a, that is, closer to the bore 43, together with the second member 23.

A port 47 is formed in an opening (15c) side portion of the cylindrical portion 15b of the cylinder member 15. The port 47 extends in a direction perpendicular to the axis of the cylindrical portion 15b. One end of the port 47 opens on the inner peripheral surface of the cylindrical portion 15b. The other end of the port 47 opens on the outer peripheral surface of the cylindrical portion 15b to communicate with the interior of the boss portion 13. The second member 23 has a port 48 extending in a direction perpendicular to the axis thereof. One end of the port 48 opens on the radially inner peripheral surface of the second member 23. The other end of the port 48 opens on the outer peripheral surface of the second member 23. The third member 24 has a port 49 extending in a direction perpendicular to the axis thereof. One end of the port 49 opens on the radially inner peripheral surface of the third member 24. The other end of the port 49 opens on the outer peripheral surface of the third member 24. The ports 47, 48 and 49 are in communication with the reservoir 14 at all times. The primary piston 16 has a port 50 extending in a direction perpendicular to the axis thereof. The port 50 allows communication between the port 49 and the primary fluid pressure chamber 45. It should be noted that the inner periphery of the portion of the cylinder member 15 that is provided with the port 47 is recessed in the shape of a step to form a recess 51.

A cup seal 53 is provided between the second member 23 and the third member 24 to cut off the communication between the primary fluid pressure chamber 45 and the ports 50 and 49. The cup seal 53 cuts off the communication between the primary fluid pressure chamber 45 and the reservoir 14 when the fluid pressure in the primary fluid pressure chamber 45 is not lower than the fluid pressure in the reservoir 14. When the fluid pressure in the primary fluid pressure chamber 45 is lower than the fluid pressure in the reservoir 14, the cup seal 53 allows communication between the primary fluid pressure chamber 45 and the reservoir 14 to supply the brake fluid.

A primary initial position setting mechanism 55 is provided between the secondary piston 17 and the primary piston 16 to define the spacing between them in an initial state where there is no input from the brake pedal side (not shown, i.e. from the right-hand side in FIG. 1). The primary initial position setting mechanism 55 has an abutting member 56 abutting against the secondary piston 17. A shaft member 57 is secured to the abutting member 56 so as to extend toward the primary piston 16. An abutting member 58 abuts against the bottom of the bore 43 in the primary piston 16 and retains the shaft member 57 in such a manner that the shaft member 57 is movable within a predetermined range. A primary piston spring 59 urges the abutting members 56 and 58 in the opposite directions to each other.

When the primary initial position setting mechanism 55 allows the abutting members 56 and 58 to be moved relative to each other by the urging force of the primary piston spring 59 and set at respective positions that are most remote from each other within the range defined by the shaft member 57, the primary piston 16 is disposed at the initial position. At this time, the primary piston 16 allows the port 50 to communicate with the port 49 and hence permits the primary fluid pressure chamber 45 to communicate with the reservoir 14.

If the primary piston 16 moves from the initial position toward the bottom 15a, when the fluid pressure in the primary fluid pressure chamber 45 is not lower than the fluid pressure in the reservoir 14, the port 50 of the primary piston 16 is closed by the cup seal 53. Consequently, the communication of the port 50 with the port 49 is cut off. Thus, the communication between the primary fluid pressure chamber 45 and the reservoir 14 is cut off. If the primary piston 16 further moves from this position toward the bottom 15a, the brake fluid is supplied from the primary fluid pressure chamber 45 to the brake system.

Figure 2:
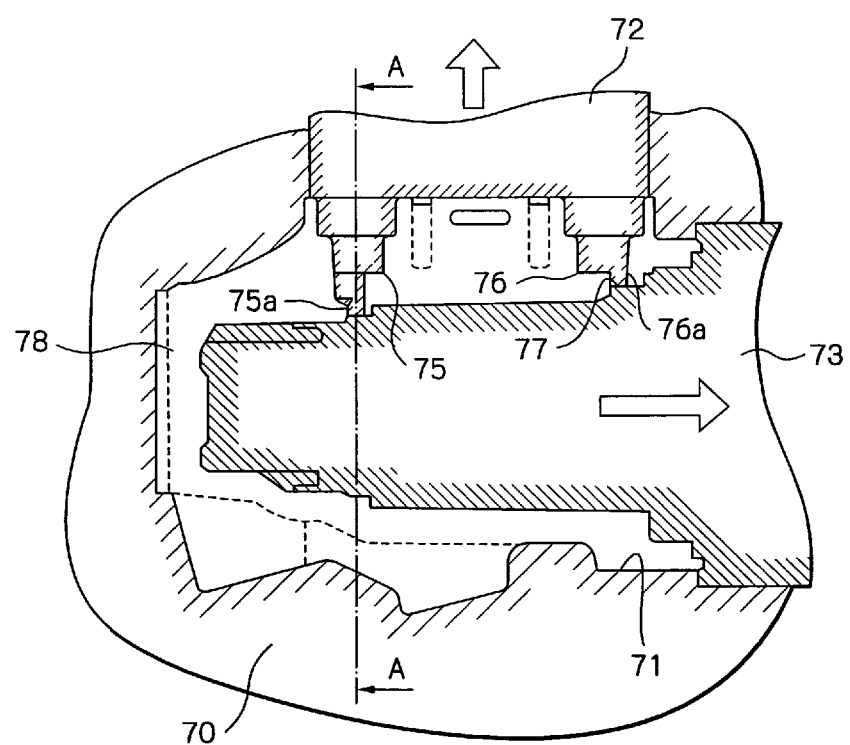
FIG. 2 is a sectional side view showing a casting mold for casting a cylinder member of the master cylinder according to one embodiment of the present invention.
Figure 3:
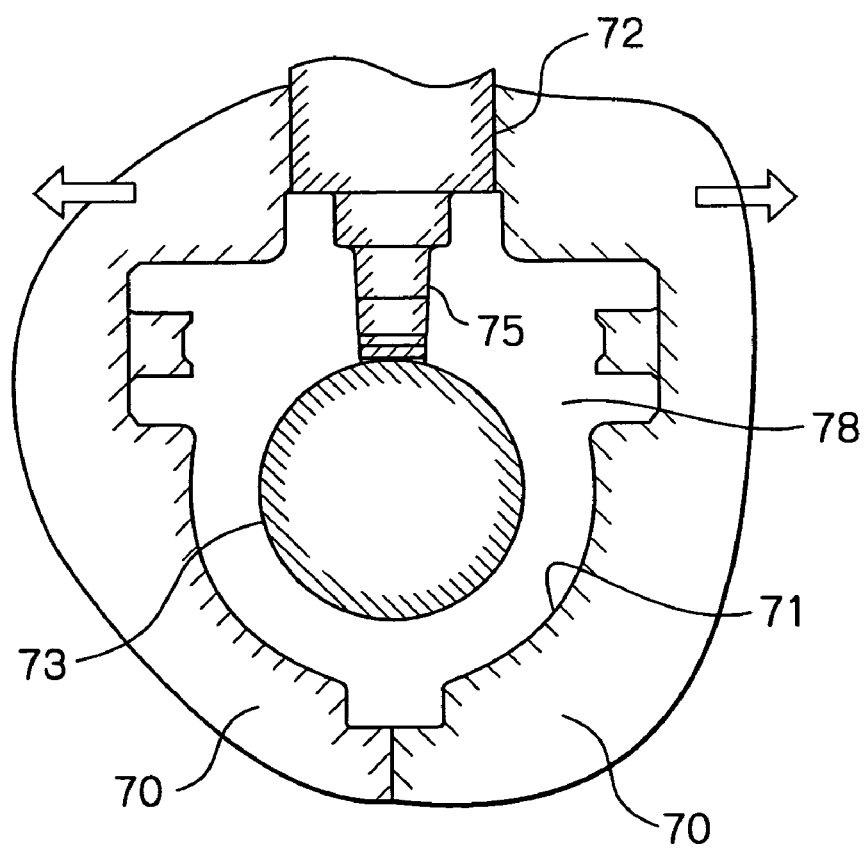
FIG. 3 is a sectional view taken along the line A—A in FIG. 2, showing the casting mold for casting the cylinder member of the master cylinder according to one embodiment of the present invention.

In this embodiment, the ports 33 and 47, which extend through the cylindrical portion 15b of the cylinder member 15 in a direction perpendicular to the axis of the cylindrical portion 15b, are both formed during casting of the cylinder member 15. That is, the cylinder member 15 is cast by using a casting mold having, as shown in FIGS. 2 and 3, a pair of first mold members 70 arranged to abut against each other to define a forming space 71 for forming the outer side of the cylinder member 15. A second mold member 72 is provided capable of advancing into and retracting from the forming space 71, which is formed by the first mold members 70 when abutting against each other, in a direction perpendicular to the axis of the cylinder member 15. A core 73 is provided capable of advancing into and retracting from the forming space 71 formed by the first mold members 70 in the axial direction of the cylinder member 15. The second mold member 72 has a projection 75 for forming the port 33 and the inner peripheral surface of the boss portion 12 and further has a projection 76 for forming the port 47 and the inner peripheral surface of the boss portion 13. The projections 75 and 76 are capable of abutting against the core 73. It should be noted that a portion of the core 73 against which the projection 76 abuts is provided with a projection 77 for forming the recess 51.

The projection 75 has a distal end portion 75a for forming the port 33. The projection 76 has a distal end portion 76a for forming the port 47. Both the distal end portions 75a and 76a have a configuration in which the length in the circumferential direction of the cylinder member 15 to be formed in the forming space 71 is longer than the length in the axial direction of the cylinder member 15. Moreover, the distal end portion 75a of the projection 75 for forming the port 33 has a trapezoidal sectional configuration decreasing in width toward the bottom 15a of the cylinder member 15. In other words, the distal end portion 75a has a pair of slant side surfaces slanting in mirror-image symmetry so as to come closer to each other toward the bottom 15a. A portion of the projection 77 at the side thereof remote from the bottom 15a (i.e. a portion for forming the portion denoted by reference symbol 51a in FIG. 5) has an isosceles trapezoidal configuration increasing in width with distance from the bottom 15a. Further, the projection 77 as a whole has an isosceles trapezoidal configuration decreasing in width radially outward in a section thereof in the direction of width (cross section). In other words, the projection 77 has slant side surfaces slanting so as to come closer to each other when it goes radially outward over the entire length thereof. In addition, the side surfaces of a portion of the projection 77 at the side thereof remote from the bottom 15a come closer to each other when it goes toward the bottom 15a.

Figure 4:
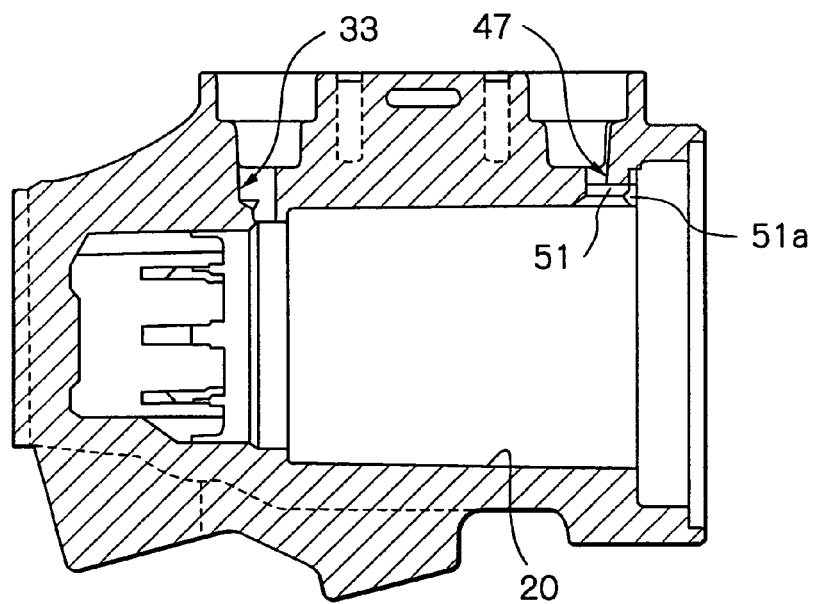
FIG. 4 is a sectional side view showing the cylinder member of the master cylinder according to one embodiment of the present invention.
Figure 5:
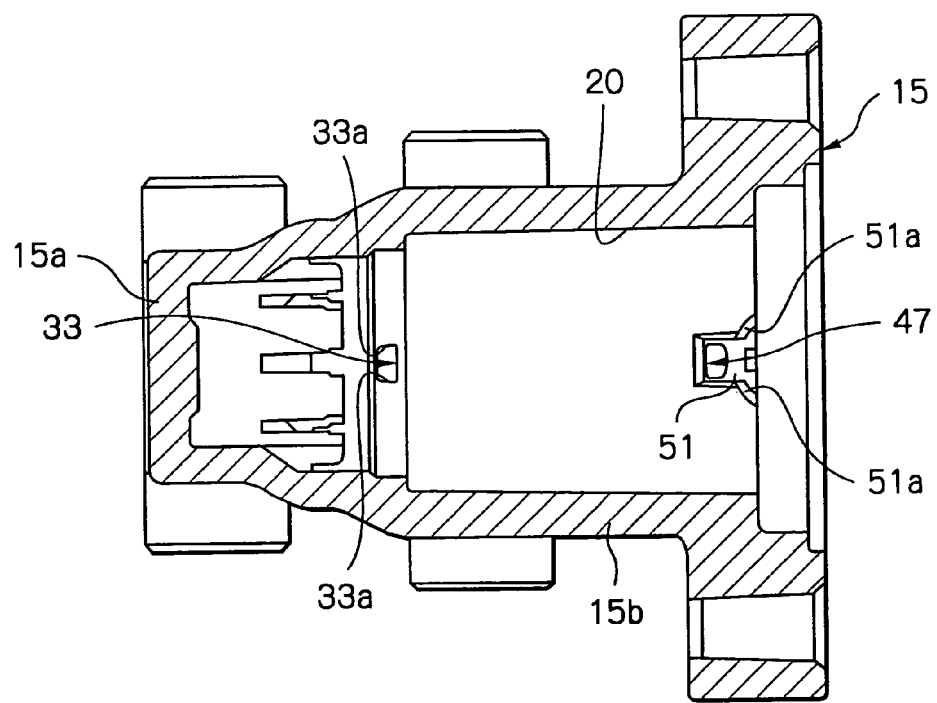
FIG. 5 is a sectional view showing the cylinder member of the master cylinder according to one embodiment of the present invention.
Figure 6:
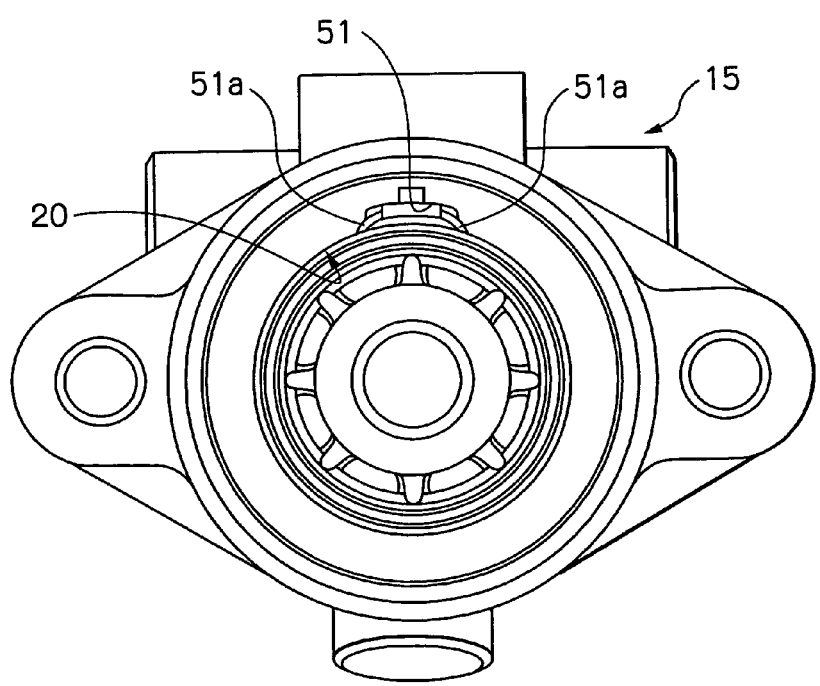
FIG. 6 is a diagram showing the cylinder member of the master cylinder according to one embodiment of the present invention as seen from the opening side thereof.

Consequently, during casting, the ports 33 and 47 are formed in the shape of elongated holes elongated in the circumferential direction of the cylinder member 15, as shown in FIGS. 4 to 6. Moreover, the port 33 has an isosceles trapezoidal sectional configuration decreasing in width toward the bottom 15a of the cylinder member 15. That is, the port 33 has a pair of slant side surfaces 33a slanting in mirror-image symmetry so as to come closer to each other toward the bottom 15a. A portion of the recess 51 at the side thereof remote from the bottom 15a has an isosceles trapezoidal configuration increasing in width with distance from the bottom 15a. Further, the projection 77 as a whole has an isosceles trapezoidal configuration decreasing in width radially outward. That is, the portion of the recess 51 at the side thereof remote from the bottom 15a is formed with side walls 15a that come closer to each other toward the bottom 15a. Moreover, the recess 51 as a whole has slant surfaces slanting so as to come closer to each other radially outward.

The first mold members 70 are aligned with each other to form the forming space 71, and the core 73 is advanced to a predetermined position in the forming space 71. Further, the second mold member 72 is advanced to a predetermined position at which it abuts against the core 73. In this state, a metal, e.g. an aluminum alloy, is poured into a cavity 78 defined by the pair of first mold members 70, the second mold member 72 and the core 73. Thereafter, the second mold member 72 and the core 73 are drawn out, and the pair of first mold members 70 are separated from each other. Thus, a casting of the cylinder member 15 before cutting process is formed. In this way, the ports 33 and 47 having the above-described configurations are formed during the casting process.

The casting of the cylinder member 15 is cut to form a stepped bore 20. Cutting of the stepped bore 20 is performed by moving a cutting tool from the opening 15c side of the cylinder member 15 toward the bottom 15a while rotating the cylinder member 15 relative to the cutting tool. At this time, creation of burrs produced on the edge of the recess 51 is reduced because the recess 51 increases in width radially inward so that the edge of the recess 51 forms an obtuse angle to the direction of the relative movement of the tool in the circumferential direction.

Figure 7:
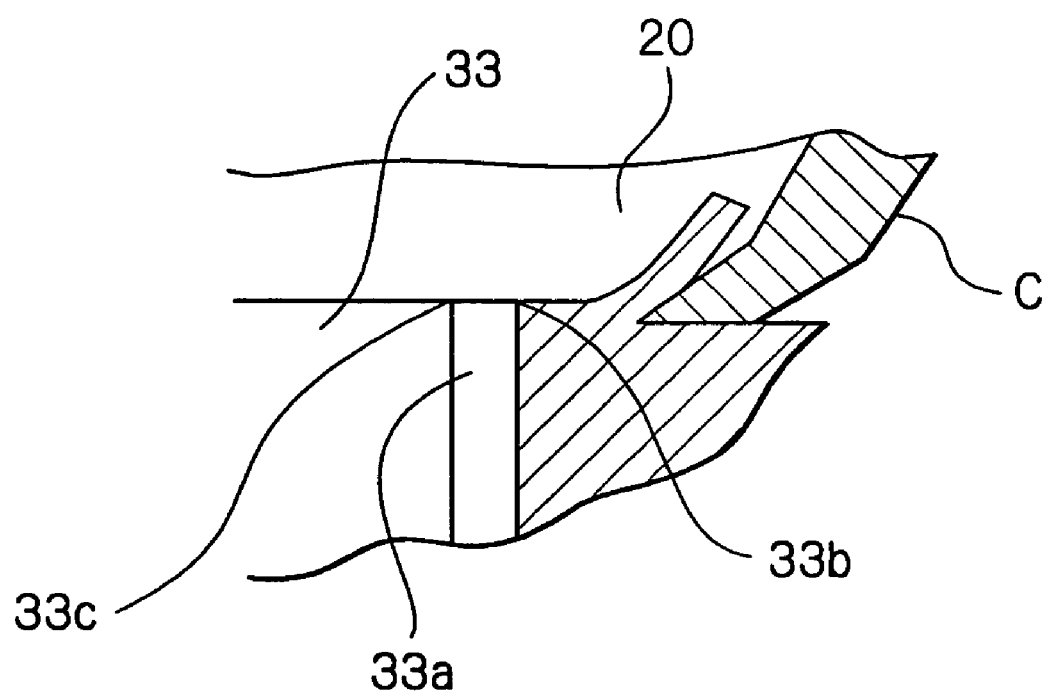
FIG. 7 is a fragmentary enlarged view showing a state where the cylinder member of the master cylinder according to one embodiment of the present invention is subjected to a cutting process.

In addition, the occurrence of burrs due to cutting are reduced along the edge of the port 33 because the port has a trapezoidal configuration increasing in width toward the opening 15c. This reduction of burrs has been confirmed by actual cutting process. The reason why burrs are reduced or suppressed may be considered as follows. When the tool moves relative to the cylinder member, it cuts the edge of the port 33 obliquely (the edge extending not parallel with the axial direction), and this produces the same effect as sharpening the tool in comparison to a case where the tool moves in a direction perpendicular to the edge of the port 33. In addition, when the cylinder member and the tool move relative to each other in the circumferential direction, the point at which the tool cuts the edge moves in a direction from point 33b to point 33c in FIG. 7. For the same reason, the creation of burrs are reduced or suppressed on the portion denoted by 51a in FIG. 5.

With the master cylinder 1 according to the foregoing embodiment, the ports 33 and 47 are formed during casting form the cylinder member 15. Therefore, it is unnecessary to form the ports 33 and 47 by boring. In addition, the ports 33 and 47 can readily be formed into a sectional configuration other than a circular one because they are formed during casting.

Accordingly, the number of man-hours for processing can be reduced, and hence the costs can be reduced. In addition, because the ports 33 and 47 can be formed in the shape of holes elongated in the circumferential direction of the cylinder member 15, it is possible to ensure a sufficient fluid passage sectional area for the ports 33 and 47.

The port 33 has a trapezoidal sectional configuration decreasing in width toward the bottom 15a of the cylinder member 15. Therefore, the edge of the port 33 is slanted with respect to the advance of the cutting tool C when machining the inner peripheral surface of the stepped bore 20 in the cylinder member 15. As a result, it is possible to reduce the creation of burrs projecting toward the port 33. Accordingly, the deburring operation becomes unnecessary. In this regard also, the number of man-hours for processing can be reduced. Hence, the costs can be reduced.

As has been described above, according to the master cylinder of the present invention, the port is formed during casting of the cylinder member. Therefore, it is unnecessary to form the port by boring. In addition, the port can readily be formed into a sectional configuration other than a circular one because it is formed during casting.

Accordingly, the number of man-hours for processing can be reduced, and hence the costs can be reduced. The port can be formed, for example, in the shape of a hole elongated in the circumferential direction of the cylinder member. Thus, it is possible to ensure a sufficient fluid passage sectional area for the port.

In one example of the master cylinder according to the present invention, the port is in the shape of a hole elongated in the circumferential direction of the cylinder member. Therefore, a sufficient fluid passage sectional area can be ensured for the port.

In another example of the master cylinder according to the present invention, the port has a trapezoidal sectional configuration decreasing in width toward the bottom of the cylinder member. Therefore, the edge of the port is slanted with respect to the advance of a cutting tool when machining the inner peripheral surface of the cylinder member. As a result, it is possible to reduce creation of burrs projecting toward the port. Accordingly, the deburring operation becomes unnecessary. In this regard also, the number of man-hours for processing can be reduced. Hence, the costs can be reduced.

What is claimed is:

1. A master cylinder comprising:
   a cylinder member in a shape of a cylinder, one end of which is closed so as to define a bottom of said cylinder member; and
   a piston inserted in said cylinder member to form a pressure chamber in said cylinder member,
   wherein said cylinder member is formed with a port for providing communication between said pressure chamber and a reservoir,
   wherein said port is a cast port formed to extend through a full thickness of a side wall of said cylinder member during casting of said cylinder member, and
   wherein said port has a generally trapezoidal configuration decreasing in width toward the bottom of said cylinder member.

2. A master cylinder according to claim 1, wherein said port is in a shape of a hole elongated in a circumferential direction of said cylinder member.

3. A method of producing a master cylinder having a cylinder member in a shape of a cylinder, one end of which is closed, and a piston inserted in said cylinder member to form a pressure chamber in said cylinder member, said cylinder member being formed with a port for providing communication between said pressure chamber and a reservoir, said method comprising:
   casting said cylinder member by using a pair of first mold members adapted to abut against each other to thereby define a forming space for forming an outer side of said cylinder member, a second mold member capable of advancing into and retracting from the forming space formed by said first mold members, in a direction perpendicular to an axis of said cylinder member, and a core capable of advancing into and retracting from the forming space formed by said first mold members in an axial direction of said cylinder member,
   wherein said port is formed as a result of said cylinder member being cast in a state where said second mold member abuts against said core.

4. A method of producing a master cylinder according to claim 3, wherein said port is formed in a shape of a hole elongated in a circumferential direction of said cylinder member.

5. A method of producing a master cylinder according to claim 3, wherein said port is formed in a generally trapezoidal configuration decreasing in width toward a bottom of said cylinder member.

6. A method of producing a master cylinder according to claim 4, wherein said port is formed in a generally trapezoidal configuration decreasing in width toward a bottom of said cylinder member.

7. A method of producing a master cylinder having a cylinder member in a shape of a cylinder and a piston inserted in said cylinder member to form a pressure chamber in said cylinder member, said cylinder member being formed with a port for providing communication between said pressure chamber and a reservoir, said method comprising:
   casting a cylinder member blank so that it has a bore partly defining said pressure chamber, a boss portion having a recess for connection with said reservoir, and a port extending through a full thickness of a side wall of the cast blank of the cylinder member for communication between said bore and said recess of the boss portion; and
   finishing said cast blank by machining said bore to provide said cylinder member.

8. A method of producing a master cylinder according to claim 7, wherein said port is formed in a shape of a hole elongated in a circumferential direction of said cast blank of the cylinder member.

9. A method of producing a master cylinder according to claim 7, wherein said cylinder member has an open end and said port is formed in a generally trapezoidal configuration increasing in width toward said open end.

10. A method of producing a master cylinder according to claim 8, wherein said cylinder member has an open end and said port is formed in a generally trapezoidal configuration increasing in width toward said open end.

* * * * *